United States Patent

[11] 3,617,872

[72] Inventors John J. Horn
East Greenwich;
George E. Corneau, Central Falls, both of R.I.
[21] Appl. No. 864,130
[22] Filed Oct. 6, 1969
[45] Patented Nov. 2, 1971
[73] Assignee Indev, Inc.
Pawtucket, R.I.

[54] MAGNETIC THICKNESS GAUGE WITH A GAS-SUPPORTED SENSOR AND A SUCTION SOURCE IN THE BASE
8 Claims, 6 Drawing Figs.

[52] U.S. Cl. .................................................... 324/34 TK,
162/198, 162/263
[51] Int. Cl. ...................................................... G01r 33/12
[50] Field of Search............................................ 324/34 TK;
33/147 L, 147 N; 73/159; 162/198, 263

[56] References Cited
UNITED STATES PATENTS
1,946,924  2/1934  Allen et al. ................... 324/40
2,665,333  1/1954  Dunipace et al. .............. 324/34 TK
3,411,075  11/1968 Kahoun ........................ 324/34 TK
3,513,555  5/1970  Vachon ......................... 324/34 TK Primary Examiner—Rudolph V. Rolinec
Assistant Examiner—R. J. Corcoran
Attorney—W. R. Hulbert ABSTRACT: In an apparatus for measuring the thickness of material including a magnetic sensor forming an incomplete magnetic circuit, a gas source, structure defining a gas-confining chamber in communication with said gas source providing a gas cushion on the top surface of said material for supporting the sensor a fixed distance above the top surface of said material, and readout means for producing a signal dependent on relative vertical sensor movement, the improvement comprising material support structure including a supporting member formed of magnetic material to complete a magnetic circuit with the sensor, and providing a flat supporting surface located opposite the sensor and contacting the underside of the material, a suction source, and structure providing communication between the suction source and the underside of the material adjacent said flat supporting surface to maintain the underside of the material flush against the flat supporting circuit such that parameters of the magnetic circuit due to the distance between the sensor and the magnetic supporting member are dependent solely on the thickness of the material.

PATENTED NOV 2 1971

PATENTED NOV 2 1971  3,617,872

MAGNETIC THICKNESS GAUGE WITH A GAS-SUPPORTED SENSOR AND A SUCTION SOURCE IN THE BASE

This invention relates to measuring the thickness of material, and particularly to continuously measuring the thickness of a travelling web.

An object of the invention is to provide improved apparatus for continuously and accurately monitoring the thickness of material (such as continuous webs of paper and the like), without hindering free travel thereof.

Another object is to provide structure of simple and economical construction for supporting a travelling web during measurement of its thickness, which serves as a magnetic reference of constant magnetic properties cooperating with a magnetic sensor to establish a magnetic circuit having its reluctance dependent on the thickness of this travelling web, and which all the while firmly and snugly supports the web during its travel past the magnetic sensor.

The invention features, in an apparatus for measuring the thickness of material including a magnetic sensor forming an incomplete magnetic circuit, a gas source, structure defining a gas-confining chamber in communication with said gas source providing a gas cushion on the top surface of said material for supporting the sensor a fixed distance above the top surface of said material, and readout means for producing a signal dependent on relative vertical sensor movement, the improvement comprising material support structure including a supporting member formed of magnetic material to complete a magnetic circuit with the sensor, and providing a flat supporting surface located opposite the sensor and contacting the underside of the material, a suction source, and structure providing communication between the suction source and the underside of the material adjacent said flat supporting surface to maintain the underside of the material flush against the flat supporting surface such that parameters of the magnetic circuit due to the distance between the sensor and the magnetic supporting member are dependent solely on the thickness of the material.

In a preferred embodiment, communication between the suction source and material is through apertures in the supporting member, arranged to include an area at least inclusive of the projected area of the gas cushion chamber on the flat supporting surface; these apertures are peripherally spaced about an imaginary circle, enclosing the projected area of the gas cushion chamber on the flat perforated supporting surface; where the material being measured is a continuous travelling sheet, the suction applied is sufficient to maintain the requisite flushness between sheet and supporting surface without inhibiting overall web travel; and, both the sensor and the material supporting member are mounted on carriages movable across the width of the material being measured, for measuring the thickness of different locations along the width.

Other objects, features and embodiments will appear from the following description of a preferred embodiment of the invention, taken together with the attached drawings thereof, in which.

Figure 1:
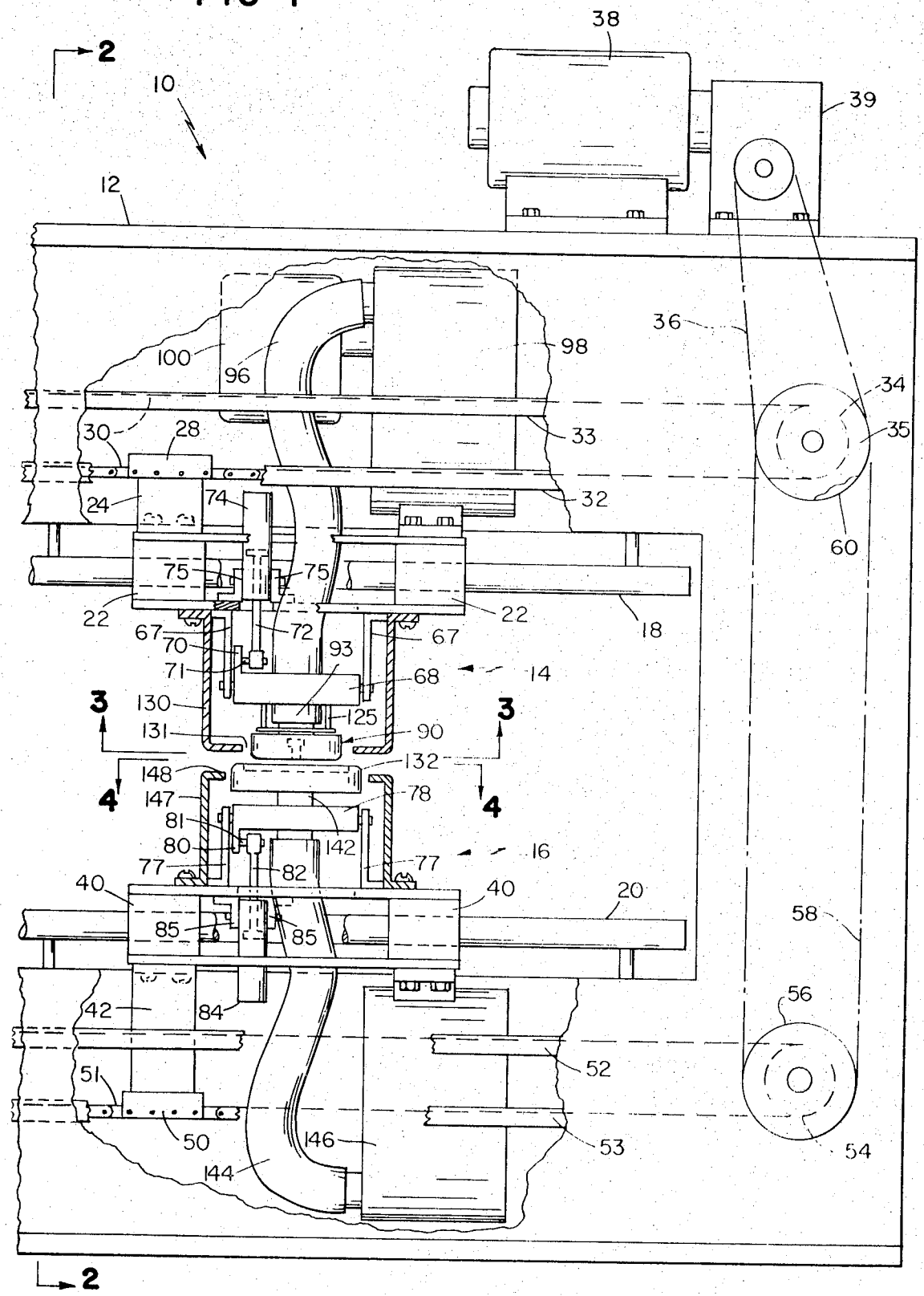
FIG. 1 is an elevational view, partially broken away, of a portion of a thickness gauging apparatus embodying the present invention.
Figure 2:
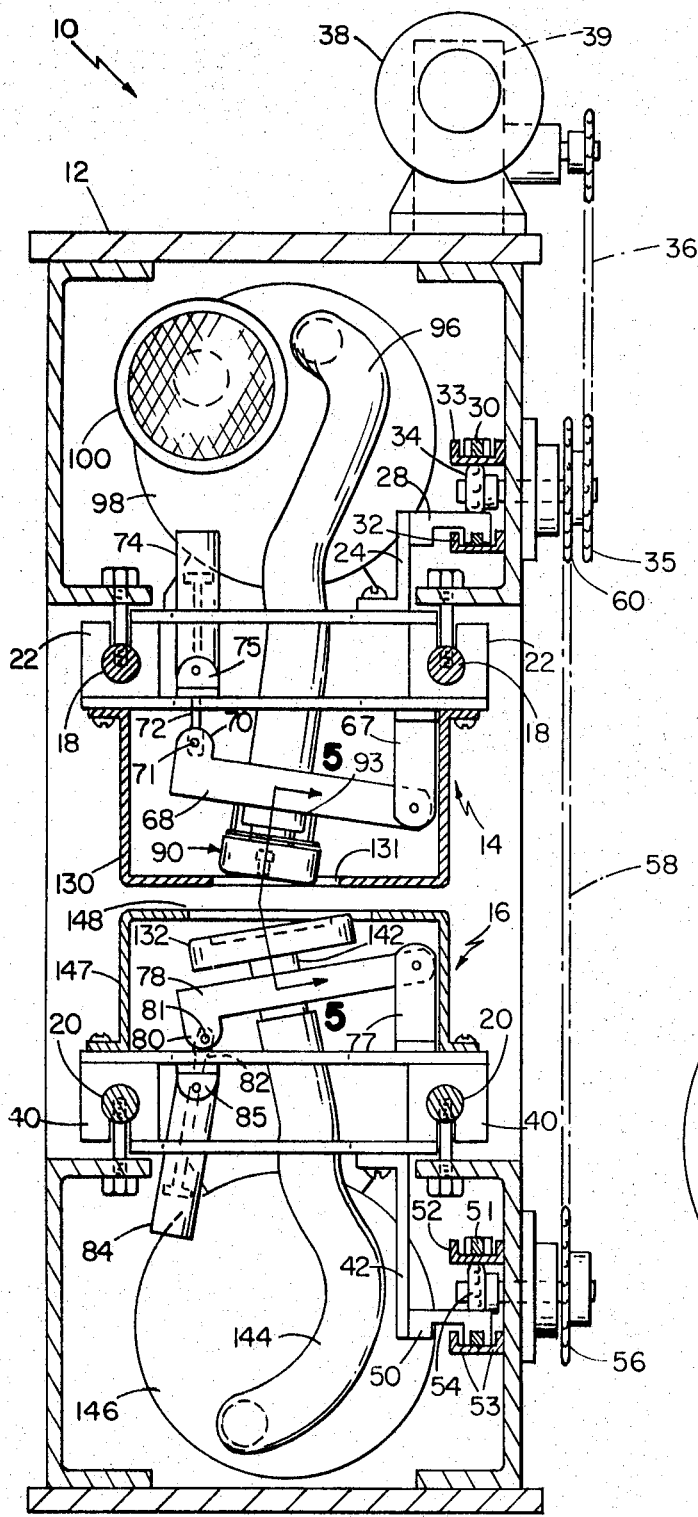
FIG. 2 is a sectional view of the apparatus of FIG. 1, along line 2—2 thereof.

FIGS. 1 and 2 show a thickness gauging apparatus 10 having a housing 12 slidably supporting sensing head carriage 14 and baseplate carriage 16 on rod pairs 18, 20, respectively. Sensing head carriage 14 has sliding blocks 22 which slide on rod pair 18, and includes connecting structure 24 having an arm 28 constructed to engage a number of links of drive chain 30 for moving head carriage 14 therewith. A lower chain track 32, and upper chain track 33 are both secured to housing 12.

As seen in FIG. 1, drive chain 30 is driven by sprocket wheel 34 which is in turn (on a common shaft therewith) driven through sprocket wheel 35 and drive chain 36 by motor 38 and transmission 39.

Baseplate carriage support 16 is similarly slidingly supported on rod pair 20 by sliding blocks 40, and has connecting structure 42, including an arm 50 constructed to engage a number of links of drive chain 51 for moving base support 16 therewith. Lower chain track 53 and upper chain track 52 are both secured to housing 12. Drive chain 51 is driven by sprocket wheel 54 which is in turn driven through sprocket wheel 56 (on a common shaft therewith), connecting drive chain 58 and sprocket wheel 60 in common with drive chain 30 by sprocket wheel 35, drive chain 36, motor 38, and transmission 39.

Sensing head carriage 14 further includes a pair of pivot bars 67, between which is rotatably fastened a mounting plate 68, which has a flange 70 at one end rotatably secured through a crank arm 71 to a piston rod 72, contained in a rotatable cylinder 74 defining a pressure chamber, cylinder 74 being rotatably secured between support members 75 on carriage 14. Baseplate carriage 16 includes similar pivot bars 77, with mounting plate 78 secured therebetween, and having a flange 80 rotatably secured through a crank arm 81 to a piston rod 82, contained in cylinder 84, which is rotatably secured between support members 85 on carriage 16.

Figure 3:
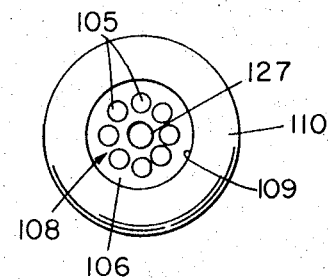
FIG. 3 is an elevational view of the sensing head of the apparatus of FIG. 1, along line 3—3 thereof, with the electromagnetic sensor removed.
Figure 4:
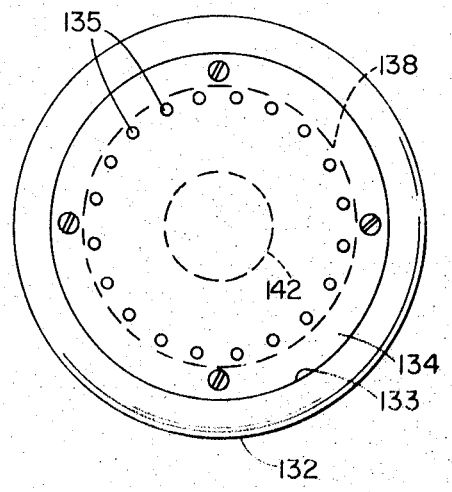
FIG. 4 is an elevational view of the web support structure of the apparatus of FIG. 1, along line 4—4 thereof.
Figure 5:
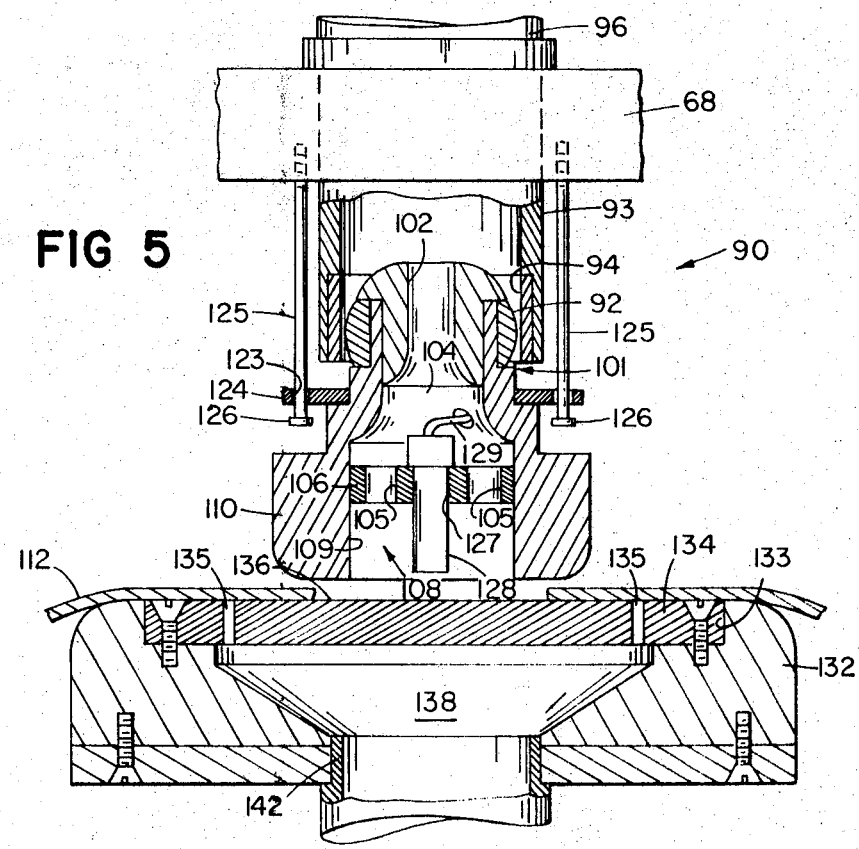
FIG. 5 is a sectional view of the sensing head and web support structure of FIG. 1; and, FIG. 6 is a diagrammatic view of circuitry useful with the apparatus of FIG. 1.

Referring to FIGS. 3 and 5, sensing head 90 has a rounded bearing surface 92 received into a cylinder 93 having an adjacent cylindrical bearing surface 94; cylinder 93 is tightly secured within mounting plate 68 and is connected through a flexible hose 96 to a blower 98 and air filter 100. Sensing head 90 is assembled from a number of pieces forming an integral member 101 defining an air inlet passage 102, and an air distribution chamber 104, which communicates through a perforated eight equally spaced 0.246-inch diameter holes 105) sensor mounting plate 106, with an annular cylindrical air-confining chamber 108 (outer diameter 1.250inch). Cylindrical wall 109 defining chamber 108 terminates at annular bottom surface 110 (2¼ inches outer diameter). Annular disc 123, secured to member 101, has spaced apertures 124 for receiving rods 125, which are secured to mounting plate 68, slidably therethrough. Stops 126 on rods 125 are sized larger than apertures 124 so that, in the absence of air flowing through chamber 108, member 101 will be supported by disc 124 on stops 126. Sensor mounting plate 106 has a central aperture 127 in which is tightly secured, for movement with the sensing head, a conventional electromagnet sensor 128, having electrical leads 129. The sensing head and connected structure are surrounded by a housing 130 of rectangular cross section having an opening 131 exposing the sensing head.

Web support plate 132 has a cylindrical bore 133 in which is fastened a perforated disc 134, of ferrous material having, (e.g., 24 0.125-inch diameter perforations 135 (having centers arranged on a 3-inch diameter imaginary circle) therethrough to an exterior web supporting surface 136. Frustoconical suction chamber 138 communicates with perforations 135 and, through a cylindrical connector 142 and a flexible hose 144, with a suitable suction-producing device 146 e.g. a vacuum pump). Web support plate 132 is surrounded by a protective housing 147 of rectangular cross section, having an opening 148 for exposing the plate therethrough.

Figure 6:
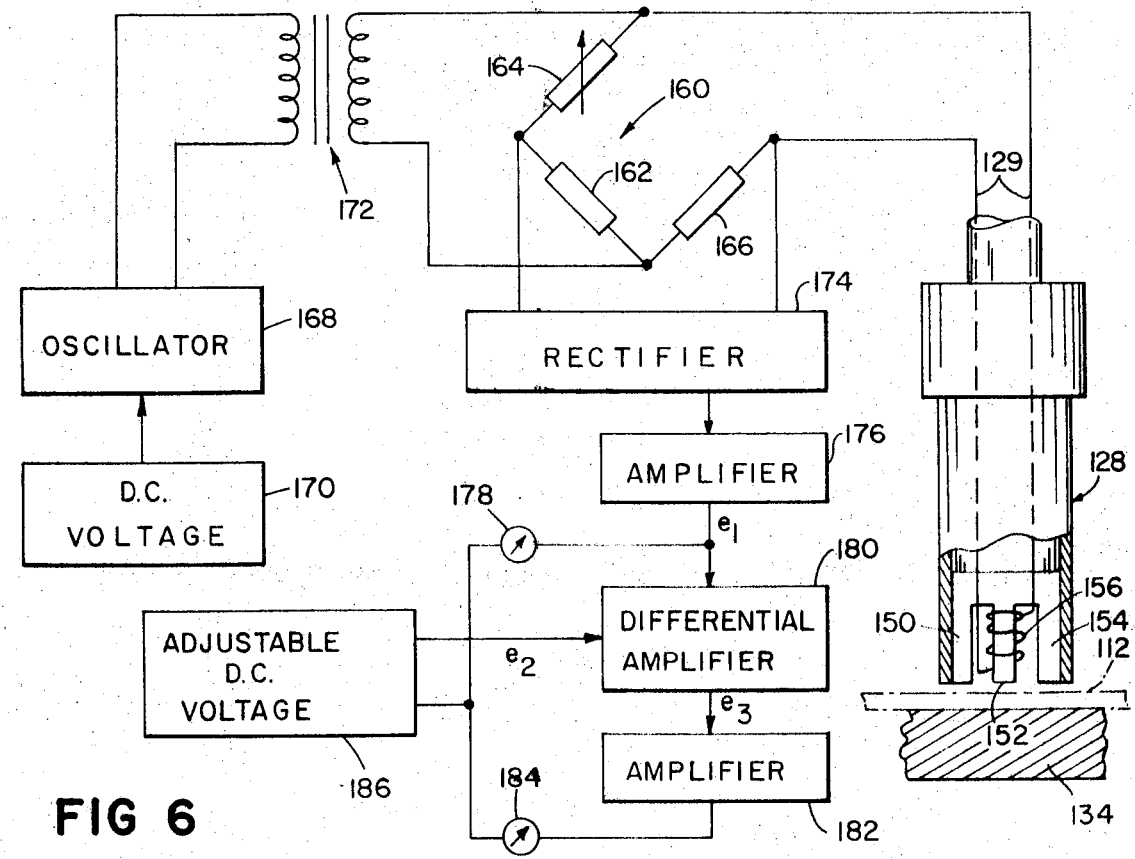

As shown in FIG. 6, electromagnetic sensor 128 includes an electromagnet 150 having a center pole piece 152, an annular pole piece 154, and a coil 156 wound around pole piece 152 and coupled by leads 129 to a bridge circuit 160. The opposite magnetic plate 134 completes the magnetic circuit of coil 156.

The bridge circuit 160 includes a parallel branch formed by the seriesdconnected fixed impedance 162 and the variable bridge balancing impedance 164 and a parallel branch formed by the series-connected fixed impedance 166 and the coil 156. Oscillator 168 is connected to a remote DC power source 170 and has its output coupled across the bridge circuit 160 by transformer 172. Connected across the fixed impedances 162 and 166 is a rectifier 174 which rectifies the AC output of the bridge circuit 160 and feeds the resultant DC signal to an amplifier 176. The output voltage $e_1$ from the amplifier 176 is transmitted to a direct current meter 178 and to a differential amplifier 180. An adjustable DC voltage source 182 feeds a constant voltage reference signal $e_2$ into the differential amplifier 180. The difference between the output signal $e_1$ and the reference signal $e_2$ is a difference signal $e_3$ fed by the differential amplifier 180 into the amplifier 182 before measurement by the DC meter 184. This electrical apparatus may be located, e.g., on top of housing 12 adjacent motor 38.

In operation, with no air supply to sensing head 90, the head will rest on stops 126. To introduce a travelling web beneath the head, pistons 74 and 84 are actuated to pivot the sensing head mounting plate 68 and the web support mounting plate 78 to the positions shown in FIG. 2. After the web has been fed between the sensing head and plate, the pistons are reversely actuated to position plate 68 and 78 as in FIG. 1. Air is supplied to sensing head 90, around the periphery of bearing surface 92, to create an air bearing therearound, maintaining bearing surface 92 spaced from bearing surface 94. In addition, air passing through the holes 105 to air-confining chamber 108 and against the top surface of web 112, supports sensing head 90 a predetermined and constant distance above the web (advantageously, about 0.020 inch). Suction is simultaneously applied to the underside of web 112 through the perforations 135 in baseplate 134 to maintain the underside of the web flush against plate surface 136, thereby overcoming the tendency of the web to "flutter" or lift off the supporting surface due to the constant airstream flowing out around the periphery of chamber 108. Perforations 135 are arranged to surround entirely the projected area of annular air cushion chamber 108 on plate surface 136, so as to maintain at least that material directly adjacent chamber 108 flush against surface 136. Therefore the length of the magnetic circuit between poles 154, 156 and plate 134 will be due solely to the thickness of the web 112 passing between the sensing head and plate 134 and the constantly maintained height of the air cushion supporting the sensing head above the web. Thus, any variance in the reluctance of the magnetic circuit will be due solely to fluctuations in the web thickness. The change in reluctance, also reflected as a change in the inductance of coil 156, will, then, be proportional to the web thickness. Thus, if the bridge circuit is initially balanced for zero output voltage at zero sheet thickness, output voltage $e_1$ will be proportional to sheet thickness so that a properly calibrated meter 178 can provide a direct indication of web thickness.

The suction through plate 134 is adjusted so as to be sufficient to prevent flutter of the web without interfering with the travel of the web through the apparatus. Meter 184 may be utilized to monitor continuously deviations in thickness of such a travelling web. Voltage source 182 is adjusted to furnish a reference voltage $e_2$ equal to the value of $e_1$, at some predetermined (i.e., preferred) web thickness. Then the difference voltage $e_3$ read on meter 184 will indicate deviation from the predetermined thickness norm whereas meter 178 will continue to provide an absolute thickness measurement.

Since webs to be measured may be wider than baseplate 134 or air cushion zone 108, the entire sensing head and base supporting carriages 14, 16, respectively, may traverse the entire width of the web upon energization of motor 38, chains 30 and 51 being operated at the same speed by identically sized sprocket wheels 34, 54. Transmission 39 may be constructed and calibrated to reverse automatically the direction of movement of chains 30, 51 each time the entire width of the web has been traversed. Thus, thickness variations both across the width and along the length of the web can be continuously monitored. Inasmuch as the sensor is always opposite the same portion of the supporting disc 134, the disc provides a fixed magnetic reference, and need not be of constant magnetic properties throughout its entire surface area.

Other embodiments will occur to those skilled in the art.

What is claimed is:

1. In an apparatus for measuring the thickness of material, said apparatus including a magnetic sensor forming an incomplete magnetic circuit, a gas source, structure defining a gas-confining chamber in communication with said gas source providing a gas cushion on the top surface of said material for supporting said sensor a fixed distance above and out of contact with said top surface, and readout means for producing a signal dependent on relative vertical sensor movements the improvement comprising material support structure including a supporting member formed of magnetic material to complete a magnetic circuit with said sensor and providing a flat supporting surface located opposite said sensor and contacting the underside of said material, a suction source, and structure providing communication between said suction source and the underside of said material through said flat supporting surface to apply suction at least to material located over an area of said flat supporting surface inclusive of the projected area of said gas-confining chamber upon said flat supporting surface in order to maintain said material flush against said area of said flat supporting surface, such that parameters of said magnetic circuit due to the distance between said sensor and said magnetic supporting member are dependent solely on the thickness of said material.

2. The apparatus of claim 1 wherein said supporting member includes a plurality of apertures therethrough extending between said suction source and the underside of said material providing said communication therebetween.

3. The apparatus of claim 2 wherein said apertures are arranged to include said area.

4. The apparatus of claim 3 wherein said perforations are peripherally spaced about an imaginary circle enclosing the projected area of said gas-confining chamber on said supporting surface.

5. The apparatus of claim 4 wherein said gas-confining chamber is of annular construction, and said perforations are located entirely outside of the projected annular area of said gas-confining chamber on said supporting surface.

6. The apparatus of claim 1 wherein said material is in the form of a continuous sheet travelling between said sensor and said support structure, and said suction source is constructed to apply suction through said perforations sufficient to maintain the said underside of said web flush against said supporting surface, while permitting travel of said sheet along said flat supporting surface.

7. The apparatus of claim 6 wherein said sensor and said material support structure are each mounted on a carriage, and said carriage is arranged for selected movement across the width of said sheet transverse to the travelling direction thereof, whereby the thickness of material sheets of width greater than the width of said flat supporting surface may be measured at preselected zones across said width.

8. The apparatus of claim 7 including a flexible suction hose between said material support structure and said suction source, said hose constructed to permit transverse movement of said support structure on said carriage across the width of said sheet.

* * * * *